United States Patent Office 2,938,875
Patented May 31, 1960

2,938,875
POLYEPOXY-SUBSTITUTED AROMATIC COMPOUNDS AND POLYMERS

Robert W. Martin, Walnut Creek, and Roy Thomas Holm, Orinda, Calif., assignors to Shell Oil Company, a corporation of Delaware No Drawing. Filed Nov. 19, 1956, Ser. No. 622,758

13 Claims. (Cl. 260—2)

This invention relates to a new class of epoxy compounds and to a method for their preparation. More particularly, the invention relates to new polyepoxides derived from aromatic hydrocarbons or aromatic halo-substituted hydrocarbons substituted with an ethylenically unsaturated hydrocarbon radical, to a method for their preparation, and to the utilization of the new polyepoxides, particularly in the preparation of new polymers and resins.

Specifically, the invention provides new and particularly useful polyepoxides comprising aromatic hydrocarbons and halo-substituted aromatic hydrocarbons substituted on at least one ring carbon atom with a vic-epoxyhydrocarbyl radical wherein the

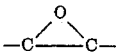

group is at least one carbon atom removed from the said ring carbon atom, and substituted on at least one other ring carbon atom with the same or different vic-epoxyhydrocarbyl radical, such as, for example, 1,4-bis(2,3-epoxypropyl)benzene. These new compounds are preferably prepared by treating the corresponding aromatic hydrocarbon and halo-substituted aromatic hydrocarbon containing ethylenically unsaturated side chains with an epoxidizing agent, such as peracetic acid.

The invention further provides polymers of the above-described polyepoxides obtained by reacting the said compounds with curing agents, such as amines, polybasic acid anhydrides, $BF_3$ and $BF_3$ complexes, metal salts and the like.

It is known that glycidyl ethers of polyhydric phenols, such as diglycidyl resorcinol, can be cured with certain epoxy curing agents to form attractive polymers. The polymers prepared from these ethers, however, are not quite as hard as one would like for certain applications and in addition have rather poor heat resistance. This latter defect renders them unsuited for many important applications, such as high temperature adhesives, laminates, and the like, where they would otherwise be of considerable value.

It is another object of the invention, therefore, to provide a new class of polyepoxides. It is a further object to provide new polyepoxides wherein the epoxy group is attached to aromatic rings through carbon, and a method for their preparation. It is a further object to provide new aromatic polyepoxides which can be cured to form polymers having outstanding heat resistance. It is a further object to provide new aromatic polyepoxides that are particularly useful and valuable in preparing high temperature adhesives and heat resistant laminates. It is a further object to provide new aromatic polyepoxides that can be cured to form products having improved hardness and toughness. Other objects and advantages of the invention will be apparent from the following detailed description thereof.

It has now been discovered that these and other objects may be accomplished by the new polyepoxides of the present invention comprising aromatic hydrocarbons or halo-substituted aromatic hydrocarbons substituted on at least one ring carbon atom with a vic-epoxyhydrocarbyl radical wherein the

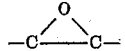

group is at least one carbon atom removed from the said ring carbon atom, and substituted on at least one other ring carbon atom with the same or different vic-epoxyhydrocarbyl radical. These compounds have been found to possess many new and valuable properties due to their unique structural feature such as having the epoxy-substituted radical attached directly to the aromatic ring through carbon instead of the customary ether oxygen linkage, as well as having one of the epoxy groups at least one carbon atom removed from the ring. These compounds, for example, have been found to be reactive through the epoxy group or groups despite the absence of vicinal ether or ester linkages, and can be polymerized through the epoxy groups to form polymeric materials. It has also been found that the resulting polymers possess unexpected properties in that they are harder than the polymers prepared from related aromatic ether or ester epoxy compounds. Thus, as shown in Example I, a polymer of glycidyl ether of Bis-phenol-A has a Barcol hardness of 0 at 150° C., while the polymer of the novel compound of the invention 1,4-bis(2,3-epoxypropyl)benzene has a Barcol hardness of 16 at 150° C. In addition, the above compounds can be cured to form polymers having outstanding heat resistance. Thus, as shown in Example I, the polymer of diglycidyl ether of Bis-phenol-A loses 36.2% by weight when heated for 200 hours at 260° C., while the polymer of the novel compound of the present invention 1,4-bis(2,3-epoxypropyl)-benzene loses 8.5% when heated for 200 hours at 260° C. In addition, in this test, the glycidyl ether of Bis-phenol-A begins to disintegrate after 24 hours while the 1,4-bis(2,3-epoxypropyl)benzene is still intact even after 200 hours of heating at 260° C.

As noted above, the new polyepoxides are preferably prepared by treating the corresponding aromatic hydrocarbon and halo-substituted aromatic hydrocarbon substituted with ethylenically unsaturated side chains with epoxidizing agents, such as peractic acid. Thus, 1,4-bis-(2,3-epoxypropyl)benzene is preferably prepared by treating 1,4-diallylbenzene with peractic acid. As to this process of preparation, it was surprising to find that the epoxidation of the ethylenic groups in the side chains goes quite easily and relatively high yields of epoxidized products are obtained in a very short period of time. Heretofore, it has been found that epoxidation of radicals, such as the allylic radicals, in many cases did not proceed very readily.

The novel products of the invention comprise aromatic hydrocarbons and halo-substituted aromatic hydrocarbons substituted on at least one ring carbon atom with a vic-epoxyhydrocarbyl radical wherein the

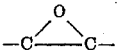

group is at least one carbon atom removed from the said ring carbon atom and substituted on at least one other ring carbon atom with the same or different vic-epoxyhydrocarbyl radical. The expression "vic-epoxy" as used herein refers to the group

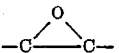

i.e., wherein the oxygen atom is attached to vicinal carbon atoms. "Vic-epoxyhydrocarbyl" radical refers to hydrocarbon radicals, such as aliphatic and cycloaliphatic radicals containing one or more

groups. As noted above, at least one of the vic-epoxyhydrocarbyl radicals must have the

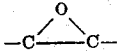

group at least one carbon atom removed from the ring carbon atom (when the radical is joined to the ring), and should preferably be from 1 to 8 carbon atoms removed from the ring as is the case with the other vic-epoxyhydrocarbyl radicals attached to the ring.

The aromatic compounds may be mononuclear or polynuclear which may be fused rings or rings joined through aliphatic or cycloaliphatic radicals. In addition, the rings may be further substituted with hydrocarbon side chains, such as aliphatic and cycloaliphatic radicals, preferably containing up to 12 carbon atoms, such as, for example, alkyl and cycloalkyl radicals as methyl, butyl, crotyl, cyclohexyl, octyl, decyl, dodecyl, cycopentyl and the like. Halogens that may be substituted on the ring include chlorine, bromine, iodine and fluorine and preferably chlorine and bromine.

Examples of the vic-epoxyhydrocarbyl substituted aromatic hydrocarbons and halo-substituted aromatic hydrocarbons include, among others, 1,4-bis(2,3-epoxypropyl)-benzene, 1,4-bis(2,3-epoxycyclohexyl)benzene, 1,4-bis-(2,3-epoxybutyl)benzene, 1,3 - di(2,3 - epoxypropyl)benzene, 1,4 - bis(2,3 - epoxyhexyl)benzene, 1 - (3,4 - epoxypentyl)-4-(2,3-epoxypropyl)benzene, 1,2-di(2,3-epoxypropyl)benzene, 4,4'-bis(2,3-epoxypropyl)diphenyl, 1,5-bis(2,3-epoxypropyl)naphthalene, 2,6 - di(2,3 - epoxypropyl)naphthalene, 1,4-bis(2,3-epoxypropyl)-2,3,5,6-tetramethyl benzene, 1,4-bis(2,3-epoxypropyl)-3,5-diisopropylbenzene, 1,4-bis(3,4-epoxybutyl)-3,5-dibutylbenzene, 1,2,3-tris(2,3-epoxypropyl)benzene, 1,2,3-tris(2,3-epoxybutyl)benzene, 1,2,3,5 - tetakis(2,3 --epoxypropyl)benzene, 1,2 - bis(2,3 - epoxypropyl) - 6 - allylbenzene, 1,4-bis(2,3-epoxypropyl)-3-cyclohexylbenzene, 2,2-bis(4-(2,3-epoxypropyl)phenyl)propane, 2,2-bis(4-(3,4-epoxybutyl)phenyl)butane, 1,1,2,2-tetrakis(4-(2,3-epoxypropyl)phenyl)-ethane, 1,1,2,2-tetrakis(4-(2,3-epoxybutyl)phenyl)butane, alpha,alpha,alpha',alpha' - tetrakis(4 - (2,3-epoxypropyl)-phenyl) 1,4-diethylbenzene, 1,3-bis(2,3-epoxypropyl)-4-chlorobenzene, 1,4-bis(2,3-epoxypentyl)-3,5-dibromobenzene, 1,4-bis(2,3-epoxycyclopentyl)-5-bromobenzene, 1-(2,3-epoxypropyl)-4-epoxyethylbenzene, 1-(2,3-epoxycyclohexyl)-4-epoxyethylbenzene and the like.

Particularly preferred compounds of the present invention include the compounds of the formula (Z)-(X)_M wherein Z is a polyvalent aromatic hydrocarbon radical whose valency is equal to M, X is an epoxyhydrocarbyl radical containing no more than 12 carbon atoms and M is at least 2, and preferably 2 to 4.

Especially preferred are those of the formula

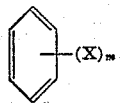

wherein X is an epoxyalkyl or epoxycycloalkyl radical containing no more than 12 carbon atoms and $m$ is 2 to 4.

The new compounds of the present invention may be prepared by a variety of methods. They may be prepared, for example, by treating the corresponding aromatic hydrocarbon or halo-substituted aromatic hydrocarbon substituted with ethylenically unsaturated side chains with HOCl and then dehydrochlorinating the resulting product, or they may be prepared, and preferably are, by treating the said corresponding unsaturated compound with an epoxidizing agent, such as peractic acid. Examples of the ethylenically unsaturated aromatic hydrocarbons and halo-hydrocarbons include, among others, 1,4-diallylbenzene, 1,4-dicyclohexenylbenzene, 1,4-dicrotylbenzene, 4-allylcrotylbenzene, 4,4'-diallyldiphenyl, 2,2-bis(4-allylphenyl)propane, 2,2,bis(2,4-diallylphenyl)propane, 2,2-bis(4-allylphenyl)pentane, 1,1,2,2 - tetrakis(4 - allylphenyl)ethane, 1,1,2,2 - tetrakis(4-crotylphenyl)butane, alpha,alpha,alpha',alpha'-tetrakis(4-allylphenyl)1,4-diethylbenzene, 1,3-diallylbenzene, 1,3-diisobutenylbenzene, 1,3-diallyl naphthalene, 4-allylvinylbenzene, 1,3-diallyl-4-chloro-benzene, 1,4-dicrotyl-2-chlorobenzene, 1,4-dicyclohexenyl-3-bromobenzene.

The aromatic hydrocarbon or halo-substituted aromatic hydrocarbon substituted with the ethylenically unsaturated side chains used in making the novel products of the invention may be prepared by methods known to the art. Thus, 1,4-diallylbenzene may be obtained by preparing the Grignard of p-bromo allylbenzene, and then reacting this material with allyl bromide to form the diallylbenzene. Polyallylic aromatics may also be prepared by reacting the aromatic hydrocarbon with allyl borate in the presence of a Friedel-Crafts catalyst as disclosed in Belgian Patent No. 545,001. Crotyl-substituted aromatics may be prepared by reacting the aromatics with butadiene as described in J. Org. Chem 16, 178 (1951). Allylic-substituted naphthalenes may be prepared by reacting disodium naphthalene with aliyl chloride. Other methods for making the ethylenically unsaturated aromatics will be apparent to those skilled in the art.

The epoxidation of the unsaturated radicals attached to the aromatic ring may be advantageously carried out by reacting the unsaturated aromatic compound with an epoxidizing agent. Organic peracids, such as peracetic acid, perbenzoic acid, monoperphthalic acid and the like, are preferred agents for this reaction.

The amount of the epoxidizing agent employed will vary over a considerable range depending upon the type of product desired. In general, one should employ at least one mole of the epoxidizing agent, such as described above, for every ethylenic group to be epoxidized. Thus, to produce di(2,3-epoxypropyl)benzene, one should react one mole of diallylbenzene with approximately two moles of the epoxidizing agent. In some cases, it is rather difficult to effect epoxidation of all of the ethylenic groups and if a completely epoxidized product is required, additional epoxidizing agents and/or longer reaction periods may be required.

It is preferred to carry out the epoxidation reaction in a suitable mutual solvent for the reactants and product. Chloroform is an especially useful solvent for the purpose, but other materials such as ethyl ether, dichloroethane, benzene, ethyl acetate, etc., and the like may be used. It is not necessary to operate under anhydrous conditions, but the amount of water present should be limited so as to avoid excessive hydrolysis of the epoxy group or groups. Up to 25% water in the reaction mixture may be tolerated.

The temperature employed during the epoxidation may vary over a considerable range depending upon the type of reactants and epoxidizing agent selected. It is generally desirable to maintain the temperature between —20° C. to 100° C. and more preferably between 10° C. and 60° C. Atmospheric, superatmospheric or subatmospheric pressures may be employed as desired.

The epoxidized products obtained by this method may be recovered from the reaction mixture by any convenient means known to the art, such as distillation, extraction, fractional precipitation, filtration, and the like.

The new polyepoxides of the present invention are water white liquids to crystalline solids depending upon the type of aromatic nucleus and the type and length of the epoxyhydrocarbyl side chains. Those prepared from the aromatic hydrocarbons are substantially free of chlorine. They are all soluble in a great many oils and solvents and are compatible with many synthetic resins and polymers. The polyepoxides are thus valuable as additives for vinyl polymers such as polyvinyl halide, as they act to both plasticize the resin as well as stabilize it against decomposition by heat and light. The new polyepoxides are also valuable in small amounts as additives for lubricating compositions both in the form of monomers and in the form of their linear polymers.

The new polyepoxides may also be further reacted with materials to form higher molecular weight products which may be cured with hardening agents to form hard cross-linked insoluble products. Such higher molecular weight compounds may be obtained, for example, by reacting the above-described new polyepoxides with polyhydric compounds. In this case, the polyhydric compound reacts with the vic-epoxy groups to form

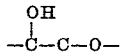

groupings. Higher molecular weight products may be obtained from 1,4-di(epoxypropyl)benzene for example, by reacting X mols of that compound with one mol of a polyhydric phenol having XOH groups. Polyhydric compounds used for this purpose may be any polyhydric phenol, such as resorcinol, 2,2-bis(4-hydroxyphenyl)propane, catechol, hydroquinone, methyl resorcinol, 2,2-bis(4-hydroxyphenyl)butane, and the like.

The condensation reaction described above for preparation of the higher molecular weight products may be accomplished by merely heating the components together in the presence or absence of inert diluents. The condensation reaction is preferably accomplished at temperatures ranging from about 25° C. to 200° C. and more preferably from 150° C. to about 200° C.

If the resulting higher molecular weight products possess less than the desired number of epoxy groups, such as may be the case when the polyhydric phenol is reacted with less than a double molar quantity of the new polyepoxides, additional epoxy groups may be introduced by reacting the higher molecular weight product with additional quantities of epoxy-forming material, e.g., epoxy-halo-alkanes, such that there will be one epoxy group for each of the OH groups of the polyhydric phenol to be reacted. Thus, if the higher molecular weight product was obtained by reacting one mole of 1,4-bis(epoxypropyl)benzene with two moles of the dihydric phenol, the resulting higher molecular weight product would then be reacted with approximately two moles of an epoxy-halo-alkane, such as epichlorohydrin.

The higher molecular weight products produced by the above methods vary from viscous liquids to solids having relatively high melting points. They possess active epoxy groups as well as hydroxyl groups and may be cured or undergo further reaction through either of these functional groups.

The new polyepoxides of the invention and their higher molecular weight products as described above may be cured through the epoxy groups to form valuable polymeric products. They may be polymerized alone or with other polyepoxide materials in a variety of different proportions, such as, for example, with amounts of other polyepoxides varying from 5% to 95% by weight. Polyepoxides that may be copolymerized with the epoxy materials of the present invention include, among others, glycidyl polyethers of polyhydric phenols obtained by reacting polyhydric phenols, such as bis-phenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

A great variety of different curing agents may be employed in effecting the above-described homo- and copolymerization. Such agents include, among others, carboxylic acids or anhydrides, such as formic acid, oxalic acid, or phthalic anhydride; Friedel-Crafts metal halides, such as aluminum chloride, zinc chloride, ferric chloride or boron trifluoride as well as complexes thereof with ethers, amines, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetraamine, dicyandiamide, melamine; and salts of inorganic acids, such as zinc fluoborate, potassium persulfate, nickel fluoborate, and magnesium perchlorate.

The amount of the curing agents employed may vary over a considerable range, such as from 1% to 200% by weight of the polyepoxide, with the exact range depending on the particular type of agent selected. With curing agents having replaceable hydrogen, such as the amine agents, amounts of agent generally employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the materials being polymerized. With the phosphoric acid and esters, particularly preferred amounts vary from about 1% to 10% by weight. The amino compounds are preferably employed in amounts varying from about 3% to 25% and the salts of the inorganic acids, such as the salts of fluoboric acid, are preferably employed in amounts varying from about 3% to 20% by weight. The other curing agents are preferably employed in amounts varying from 1% to 20%.

The higher molecular weight hydroxy-containing products may also be cured through the hydroxy group by the addition of appropriate amounts, e.g., 1% to 25% by weight of polybasic acids or anhydrides, polyisocyanates, methylol compounds and the like.

The cure of the polyepoxides is preferably effected by mixing the curing agent with the polyepoxide and heating. Curing temperatures range generally from room temperature to about 200° C., the exact range preferably depending on the curing agent selected. Active curing agents, such as the aliphatic amines may be utilized, for example, at lower temperatures, such as from room temperature to about 60° C. Less active materials, such as polybasic anhydrides and acids, generally require higher temperatures, such as temperatures ranging from about 60° C. to 150° C. Aromatic amines are preferably employed at the higher temperatures, e.g., temperatures ranging from 60° C. to 150° C.

If the new polyepoxides and their higher molecular weight derivatives are to be used in the preparation of castings or pottings, the curing agent and the epoxy material are generally combined together and then poured into the mold or casting which may if desired contain additional material, such as electrical wires or apparatus, and the mixture heated to effect the cure.

The new polyepoxides and their higher molecular weight derivatives may also be employed with the afore-described curing agents to prepare improved surface coating compositions of the air-drying or baking type. In utilizing the products for this application, it is generally desirable to combine the epoxy material and curing agent with the desired solvents, and, if desired, other film-forming materials and driers, and then apply the resulting mixture to the surface to be coated. Film-forming materials that can be used with the epoxy material in this manner include the drying oils, such as tung oil, linseed oil, dehydrated castor oil, soyabean oil, and the like; cellulose derivatives such as cellulose nitrate, cellulose acetate, cellulose acetate butyrate, cellulose propionate, ethyl cellulose, and mixtures thereof; and vinyl polymers, such as polymers of vinyl chloride, vinylidene chloride, methyl methacrylate, diallyl phthalate, and the like. The coatings prepared in this manner may be allowed to set to a hard finish at room temperature or heat may be applied to hasten the cure.

The liquid polyepoxides of the invention may be used to prepare solventless varnishes. In this application, the liquid polyepoxides and other desired coating resins are combined with the hardening agent and the mixture applied as a coating.

The higher molecular weight hydroxy-containing derivatives of the new polyepoxides as described above are particularly suited for use in preparing coating compositions as described above, as they may be reacted through the hydroxyl group or groups with drying oil fatty acids or may be cured through the hydroxyl groups with compounds such as methylol urea or melamines or diisocyanates.

The new polyepoxides and their higher molecular weight derivatives may also be employed with the curing agents to prepare valuable adhesive and impregnating compositions. If the new monomeric products are used for this application they may be used as such without the use of a diluent; while the higher molecular weight products may be used with solvents, such as benzene, toluene, acetonitrile, and the like. The curing agent is then added to the spreadable mixture and the mixture applied to the desired surface.

In addition to their use in forming the above-described polymeric products, the new polyepoxides and their higher molecular weight derivatives may be used as stabilizing agents for various halogen-containing polymers, and particularly the vinyl halide polymers. These products are compatible with the polymers and in combination therewith give good resistance to discoloration by heat and light. These products may be used as stabilizers, alone or in combination with other stabilizing agents, such as ureas and metal salts as Cd salts. In most cases, the products are effective as stabilizers in amounts varying from about .1% to 5% by weight of the polymer being stabilized. The epoxy material may be combined with the halogen-containing polymer by any suitable method, such as by dissolving the products in a suitable solvent or by milling the products together on a suitable roll mill.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

*Example I*

This example illustrates the preparation and some of the properties of 1,4-bis(2,3-epoxypropyl)benzene.

20 parts of 1,4-diallylbenzene (prepared by reacting p-allyl phenyl magnesium bromide with allyl bromide and having boiling point 94–96° C. (12 mm.) N 20/D 1.5189) and 150 parts of chloroform were placed in a reaction kettle and heated to 40° C. 53 parts of 40% aqueous peracetic acid solution containing 4.5 parts of 20% sodium acetate (added to neutralize strong mineral acid catalyst present in peracetic acid) was added dropwise over a period of 30 minutes. The reaction mixture was kept at 40–50° C. for one hour and then allowed to stand overnight at room temperature. The mixture was then diluted with water and the chloroform layer washed with water and dilute sodium carbonate. The organic layer was dried over Na$_2$SO$_4$ and the chloroform evaporated. The residue was distilled to yield a low melting (30° C.) crystalline solid identified as 1,4-di(2,3-epoxypropyl)benzene, epoxy value 1.049 eq./100 g., calc. 1.05 eq./100 g.

100 parts of the 1,4-bis(2,3-epoxypropyl)benzene produced above was combined with 25 parts of meta-phenylene diamine and the mixture heated at 80° C. for 2 hours and then at 200° C. for 1 hour. The resulting product was a very hard insoluble casting which had excellent resistance to heat. The Barcol hardness of the casting at various temperatures is shown in the following table in comparison to the hardness of a casting prepared in a similar way from diglycidyl ether of Bis-phenol-A:

| Polyepoxide | 60° C. | 80° C. | 100° C. | 120° C. | 140° C. | 150° C. |
|---|---|---|---|---|---|---|
| 1,4-bis(epoxypropyl) benzene | 42 | 40 | 32 | 29 | 25 | 16 |
| Diglycidyl ether of Bis-phenol-A | 35 | 28 | 23 | 16 | 5 | 0 |

The unusual heat resistance of the casting is shown in the following experiment. The casting was heated at 260° C. for 200 hours and then the weight loss and appearance of the casting determined. At the end of 200 hours, the casting had lost 8.5% in weight but was still strong and tough. The casting prepared from diglycidyl ether of Bis-phenol-A, however, when heated under the same conditions began to deteriorate after 24 hours, and at the end of 200 hours showed a weight loss of 36.2% and was a useless product being a friable foam.

Another casting was prepared by heating 75 parts of 1,4-di(2,3-epoxypropyl)benzene and 25 parts of diglycidyl ether of 2,2-bis(4-hydroxyphenyl)propane with 25 parts of meta-phenylene diamine at 150° C. for 2 hours. The resulting product was a very hard insoluble casting having good heat resistance.

Related products are obtained by replacing the diallylbenzene in the above preparation process with diallyl toluene and diallyl ethyl benzene.

*Example II*

This example illustrates the preparation and some of the properties of 1,4-bis(2,3-epoxypropyl) 2,3,5,6-tetramethylbenzene.

27 parts of 1,4-diallyl-2,3,5,6-tetramethylbenzene is added to 150 parts of chloroform. 53 parts of 40% peracetic acid solution containing 4.5 parts of 20% sodium acetate was added dropwise over a period of 30 minutes. The reaction mixture was kept at 40° C. to 50° C. for one hour and then allowed to stand overnight at room temperature. The mixture was then diluted with water and the chloroform layer washed with water and dilute sodium carbonate. The mixture was dried over Na$_2$SO$_4$ and the chloroform evaporated. The residue was distilled to yield a solid identified as 1,4-bis(2,3-epoxypropyl)2,3,5,6-tetramethylbenzene.

100 parts of the 1,4-bis(2,3-epoxypropyl)2,3,5,6-tetramethylbenzene produced above was combined with 25 parts of meta-phenylene diamine and the mixture heated at 80° C. for 2 hours and then at 200° C. for 1 hour. The resulting product was a very hard insoluble casting which had excellent resistance to heat. Related results are obtained by replacing the metaphenylene diamine in the above process with equivalent amounts of each of the following curing agents: diaminodiphenylsulfone, adduct of meta-phenylene diamine and phenyl glycidyl ether, diaminopyridine and 1,4-diaminocyclohezane.

*Example III*

This example illustrates the preparation and some of the properties of 1,4-bis(2,3-epoxybutyl)benzene.

25 parts of 1,4-dicrotylbenzene (prepared by reacting benzene with butadiene) are combined with 150 parts of chloroform. 53 parts of 40% peracetic acid solution containing 4.5 parts of 20% sodium acetate is added dropwise over a period of 30 minutes. The reaction mixture is kept at 40° C. to 50° C. for one hour and then allowed to stand overnight at room temperature. The mixture is then diluted with water and the chloroform layer washed with water and dilute sodium carbonate. The mixture is dried and the chloroform taken off. The residue is distilled to yield a product identified as 1,4-bis(2,3-epoxybutyl)benzene.

100 parts of the 1,4-bis(2,3-epoxybutyl)benzene prepared above is combined with 25 parts of meta-phenylene diamine and the mixture heated at 150° C. for two hours. The resulting product is a very hard insoluble casting having excellent heat resistance.

Another casting is prepared by heating 50 parts of 1,4-bis(2,3-epoxybutyl)benzene and 50 parts of diglycidyl ether of 2,3-bis(4-hydroxyphenyl)propane with 25 parts of meta-phenylene diamine at 150° C. for two hours. The resulting product is a very hard, insoluble casting having excellent heat resistance.

*Example IV*

This example illustrates the preparation and some of the properties of 1,4-bis(epoxycyclohexyl)benzene.

31 parts of 1,4-bis(cyclohexenyl)benzene (prepared by reacting cyclohexenylphenylmagnesium bromide with cyclohexenyl bromide) is combined with 150 parts of chloroform. 53 parts of 40% peracetic acid solution containing 4.5 parts of 20% sodium acetate is added dropwise over a period of 30 minutes. The reaction mixture is kept at 40° C. for several hours. The mixture is then diluted with water and the chloroform layer washed with water and dilute sodium carbonate. The mixture is dried and the chloroform taken off. The residue is distilled to yield 1,4-bis(epoxycyclohexyl)benzene.

100 parts of the 1,4-bis(epoxycyclohexyl)benzene produced above is combined with 20 parts of meta-phenylene diamine and the mixture heated at 150° C. for two hours. The resulting product is a very hard, insoluble casting having excellent heat resistance.

Another casting is prepared by heating 50 parts of the 1,4-bis(epoxycyclohexyl)benzene with an equivalent amount of phthalic anhydride and 3 parts of benzyldimethylamine at 100° C. for 3 hours. The resulting product is a hard, insoluble casting having good heat resistance.

*Example V*

This example illustrates the preparation and properties of 1-epoxyethyl-4-(2,3-epoxypropyl)benzene.

20 parts of 1-vinyl-4-allylbenzene (prepared from p-vinyl phenyl magnesium bromide and allyl bromide) is combined with 150 parts of chloroform. 53 parts of 40% peracetic acid solution containing 4.5 parts of 20% sodium acetate is added dropwise over a period of 30 minutes. The reaction mixture is kept at 40° C. for several hours. The mixture is then diluted with water and the chloroform layer washed with water and dilute sodium carbonate. The mixture is dried and the chloroform taken off. The residue is distilled to yield 1-epoxyethyl-4-(2,3-epoxypropyl)benzene.

100 parts of the 1-epoxyethyl-4-(2,3-epoxypropyl)benzene is heated with 25 parts of meta-phenylene diamine and the mixture heated at 150° C. for 1 hour. The resulting product is a hard insoluble casting having good heat resistance.

*Example VI*

Bis(2,3-epoxypropyl)chlorobenzene is obtained by reacting 1,4-diallyl-2-chlorobenzene (prepared by reacting 1,4-bischloromethyl-2-chlorobenzene with NaC≡CH and hydrogenating in the presence of nickel catalyst) with peracetic acid as in the preceding example. This polyepoxide can be cured with meta-phenylene diamine at 150° C. to form hard, heat resistant castings.

We claim as our invention:

1. Polyepoxides comprising aromatic compounds of the group consisting of monomeric aromatic hydrocarbons and halo-substituted aromatic hydrocarbons which are substituted on at least one aromatic ring carbon atom with a saturated vic-epoxyhydrocarbyl radical wherein the epoxy group is at least one carbon atom removed from the said ring carbon atom, and are substituted on at least one other aromatic ring carbon atom with a saturated vic-epoxyhydrocarbyl radical.

2. A polyepoxide comprising a monomeric aromatic hydrocarbon containing from 6 to 18 carbon atoms which is substituted on each of at least two aromatic ring carbon atoms with a saturated vic-epoxyhydrocarbyl radical wherein the epoxy group is at least one and not more than 10 carbon atoms removed from the aromatic ring carbon atom to which the epoxyhydrocarbyl radical is attached.

3. Polyepoxides of the formula:

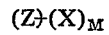

wherein Z is a polyvalent monomeric aromatic hydrocarbon radical whose valency is equal to M, X is a saturated vic-epoxyhydrocarbon radical containing no more than 12 carbon atoms, in at least one of the said epoxyhydrocarbon radicals, the epoxy group being at least one carbon atom removed from the carbon atom of the aromatic ring to which the said epoxyhydrocarbon group is attached, and M is an integer of from 2 to 4.

4. A poly(vic-epoxyalkyl)benzene wherein the epoxy group is separated by at least one carbon atom from the carbon atom of the benzene ring to which the epoxyalkyl group is attached.

5. A poly(vic-epoxyalkyl)alkylbenzene, wherein the epoxy group is separated by at least one carbon atom from the carbon atom of the benzene ring to which the epoxyalkyl group is attached.

6. A poly(vic-epoxycycloalkyl)benzene, wherein the epoxy group is separated by at least one carbon atom from the carbon atom of the benzene ring to which the epoxycycloalkyl group is attached.

7. Bis(2,3-epoxyalkyl)benzene.

8. 1,4-bis(2,3-epoxypropyl)benzene, wherein the epoxy group is separated by at least one carbon atom from the carbon atom of the benzene ring to which the epoxycycloalkyl group is attached.

9. 1,4-bis(2,3-epoxypropyl)2,3,5,6-tetramethylbenzene.

10. 1,4-bis(2,3-epoxybutyl)benzene.

11. 1,4-bis(2,3-epoxycyclohexyl)benzene.

12. A cross-linked insoluble polymer comprising the reaction product of a polyepoxide selected from the group consisting of monomeric aromatic hydrocarbons and halo-substituted aromatic hydrocarbons which are substituted on at least one aromatic ring carbon atom with a saturated vic-epoxyhydrocarbyl radical wherein the epoxy group is at least one carbon atom removed from the said ring carbon atom, and are substituted on at least one other aromatic ring carbon atom with a saturated vic-epoxyhydrocarbyl radical and an amine as curing agent.

13. A cross-linked insoluble polymer comprising the reaction product of a polyepoxide selected from the group consisting of monomeric aromatic hydrocarbons and halo-substituted aromatic hydrocarbons which are substituted on at least one aromatic ring carbon atom with a saturated vic-epoxyhydrocarbyl radical wherein the epoxy group is at least one carbon atom removed from the said ring carbon atom, and are substituted on at least one other aromatic ring carbon atom with a saturated vic-epoxyhydrocarbyl radical and a carboxylic acid anhydride as curing agent.

References Cited in the file of this patent

Everett et al.: J. Chem. Soc., 1950, page 3133.

UNITED STATES PATENT OFFICE
CERTIFICATE OF CORRECTION

Patent No. 2,938,875                                              May 31, 1960

Robert W. Martin et al.

It is hereby certified that error appears in the printed specification of the above numbered patent requiring correction and that the said Letters Patent should read as corrected below.

Column 10, lines 44 to 47, claim 8 should appear as shown below instead of as in the patent:

8. 1,4-bis(2,3-epoxypropyl)benzene.

Signed and sealed this 1st day of November 1960.

(SEAL)
Attest:

KARL H. AXLINE
Attesting Officer

ROBERT C. WATSON
Commissioner of Patents